United States Patent
Iwasaki et al.

(10) Patent No.: US 9,916,204 B2
(45) Date of Patent: *Mar. 13, 2018

(54) DATA BACKUP USING METADATA MAPPING

(71) Applicant: International Business Machines Corporation, Armonk, NY (US)

(72) Inventors: Norie Iwasaki, Fujisawa (JP); Sosuke Matsui, Tokyo (JP); Tsuyoshi Miyamura, Yokohama (JP); Terue Watanabe, Tokyo (JP); Noriko Yamamoto, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/428,438

(22) Filed: Feb. 9, 2017

(65) Prior Publication Data

US 2017/0153950 A1    Jun. 1, 2017

Related U.S. Application Data

(63) Continuation of application No. 14/813,456, filed on Jul. 30, 2015.

(30) Foreign Application Priority Data

Aug. 8, 2014  (JP) ................. 2014-162674

(51) Int. Cl.
  *G06F 17/30*  (2006.01)
  *G06F 11/14*  (2006.01)

(52) U.S. Cl.
  CPC ...... *G06F 11/1451* (2013.01); *G06F 11/1464* (2013.01); *G06F 17/30117* (2013.01); *G06F 2201/84* (2013.01)

(58) Field of Classification Search
  CPC .......... G06F 11/1451; G06F 11/1458; G06F 11/1435; G06F 11/1448; G06F 11/1453;
  (Continued)

(56) References Cited

U.S. PATENT DOCUMENTS 7,054,960 B1   5/2006  Bezbaruah et al.
7,603,391 B1  10/2009  Federwisch et al.
(Continued)

FOREIGN PATENT DOCUMENTS

JP        11120057 A    4/1999
JP      2001216185 A    8/2001
(Continued)

OTHER PUBLICATIONS

IBM, "Backing up a file system using the mmbackup command", IBM Knowledge Center, in General Parallel File System 3.5.0, printed on May 15, 2015, pp. 1-2, http://www.-01.ibm.com/support/knowledgecenter/SSFKCN_3.5.0/com.ibm.cluster.gpfs.v3r5.gpfs100.doc/bl1adm_backupusingmmbackup.htm.
(Continued)

*Primary Examiner* — Dennis Truong
(74) *Attorney, Agent, or Firm* — Stosch Sabo

(57) ABSTRACT

An information processing apparatus, backup method, and program product that enable efficient differential backup. In one embodiment, an information processing apparatus for files stored in a storage device includes: a metadata management unit for managing metadata of files stored in the storage device; a map generation unit for generating a map which indicates whether metadata associated with an identification value uniquely identifying a file in the storage device is present or absent; and a backup management unit for scanning the metadata to detect files that have been created, modified, or deleted since the last backup, and storing at least a data block and the metadata for a detected
(Continued)

file in a backup storage device as backup information in association with the identification value.

4 Claims, 11 Drawing Sheets

(58) Field of Classification Search
CPC .......... G06F 11/1471; G06F 11/1446; G06F 2201/84; G06F 2201/82; G06F 17/30368; G06F 17/30197; G06F 17/30575; G06F 17/30117; G06F 17/30212; G06F 17/3023; G06F 11/203; G06F 11/2056; G06F 11/2082; G06F 11/2094; G06F 12/16; G06F 11/1076; G06F 3/0647; G06F 11/1469; G06F 17/30088
USPC ....... 707/646, 625, 650, 648, 649, 654, 670, 707/797; 711/162, 161; 714/15
See application file for complete search history.

(56) References Cited

U.S. PATENT DOCUMENTS

| | | | |
|---|---|---|---|
| 7,831,789 B1 | 11/2010 | Per et al. | |
| 7,870,356 B1 | 1/2011 | Veeraswamy et al. | |
| 7,900,088 B1 | 3/2011 | Pawar et al. | |
| 8,015,375 B1* | 9/2011 | Gulve | G06F 11/1464 711/111 |
| 8,214,406 B2 | 7/2012 | Kushwah | |
| 8,364,648 B1* | 1/2013 | Sim-Tang | G06F 17/30368 707/674 |
| 8,606,751 B1* | 12/2013 | Starling | G06F 11/1458 707/634 |
| 8,990,162 B1 | 3/2015 | Kushwah et al. | |
| 8,990,164 B1 | 3/2015 | Mahajan et al. | |
| 9,146,928 B1 | 9/2015 | Noveck | |
| 9,348,827 B1 | 5/2016 | Patwardhan et al. | |
| 9,411,821 B1 | 8/2016 | Patwardhan et al. | |
| 9,645,892 B1* | 5/2017 | Patwardhan | G06F 11/1466 |
| 2004/0030846 A1 | 8/2004 | Armangau et al. | |
| 2007/0255921 A1* | 11/2007 | Gole | G06F 3/0605 711/170 |
| 2009/0006792 A1 | 1/2009 | Federwisch et al. | |
| 2009/0228511 A1 | 9/2009 | Atkin et al. | |
| 2010/0287348 A1 | 11/2010 | Sampathkumar et al. | |
| 2016/0041884 A1 | 2/2016 | Iwasaki et al. | |
| 2017/0123937 A1* | 5/2017 | Iwasaki | G06F 11/1469 |

FOREIGN PATENT DOCUMENTS

| | | | |
|---|---|---|---|
| JP | 2005018757 A | 1/2005 | |
| JP | 2005018758 A | 1/2005 | |
| JP | 2005085145 A | 3/2005 | |
| JP | 2005292865 A | 10/2005 | |
| JP | 2007102692 A | 4/2007 | |
| JP | 2007115007 A | 5/2007 | |
| JP | 2010049488 A | 3/2010 | |
| JP | 2011003050 A | 1/2011 | |
| JP | 2011028716 A | 2/2011 | |
| JP | 2013542513 A | 11/2013 | |
| JP | 2014123254 A | 7/2014 | |

OTHER PUBLICATIONS

IBM, "General Parallel File System: Administration and Programming Reference", Version 4, Release 1, SA23-1452-00, Copyright IBM Corporation 2014, pp. 1-700.

IBM, "Tuning backups with the mmbackup command", IBM Knowledge Center, in General Parallel File System 4.1.0, printed on May 15, 2015, pp. 1-2. http://www.-01.ibm.com/support/knowledgecenter/SSFKCN_4.1.0/com.ibm.cluster.gpfs.v4r1.gpfs100.doc/bl1adm_backuptuning.htm.

"Information Processing Apparatus, Information Processing System, Backup Method, and Program", Japan Patent Application 2014-162674, English Translation, filed Aug. 8, 2014, pp. 1-47.

Decision to Grant a Patent, Application No. 2014-162674, dated Jul. 12, 2016. Translated Sep. 27, 2016. 6 pages.

Notification of Reasons for Refusal, Application No. 2014-162674, dated Apr. 18, 2016. Translated Sep. 27, 2016. 7 pages.

List of IBM Patents or Patent Applications Treated as Related, Feb. 8, 2017. 2 pages.

List of IBM Patents or Patent Applications Treated as Related, Sep. 18, 2017, 2 pages.

Iwasaki et al., "Data Backup Using Metadata Mapping", U.S. Appl. No. 15/708,376, filed Sep. 19, 2017.

Iwasaki et al., "Data Backup Using Metadata Mapping", U.S. Appl. No. 15/708,394, filed Sep. 19, 2017.

* cited by examiner

DATA BACKUP USING METADATA MAPPING

TECHNICAL FIELD

The present invention relates to an information backup technique, and more particularly, to a technique for backing up information recorded in a storage medium.

BACKGROUND OF THE INVENTION

Digital information has grown in volume and added value thereof has increased in connection with information processing by computers and the like. In order to prevent loss of such high-value information due to disasters and the like, it is recommended to regularly replicate a backup of a file system in another storage medium, such as magnetic tape or a hard disk drive, for redundant recording. A backup process requires a certain amount of time, as it involves a reading and writing process to write information recorded in the original storage medium into another storage medium.

Processing load of a backup operation is not very problematic when the amount of data is small. Regular backup of business-related information, possibly in excess of several terabytes, however, imposes heavy processing load on an information processing apparatus due to periodical performance, and also takes an increasingly long processing time as files grow in size.

Reduction in the time required for the backup process permits a Recovery Point Objective (RPO) to be set at shorter time intervals, which in turn enables data restoration with higher accuracy; improvement in efficiency of the backup process is an issue of increasing importance. A regular backup is often performed by detecting differential data between the files currently stored in a storage device and the files recorded in the last backup and taking only the detected differential data as a backup in order to perform the backup efficiently and without overlap. This scheme will be hereinafter referred to as a differential backup.

An example of known methods of detecting differential data for performing a differential backup is to combine an inode scan with comparison of two file lists, the current file list and the previous file list. An "inode" is an object that stores metadata of a file (such as size, mtime, UID, and data block address) and it exists for each file. Inode scan refers to the process of reading metadata of each file present in a file system and listing those files whose last update time (mtime/ctime) is later than the time of their last backup.

Inode scan, however, can only detect files that have a recent last update time and that actually exist. Inode scan, accordingly, has to be combined with file list comparison in order to find deleted files. Thus, when inode scan is applied to a huge file system that contains several billions of files, an enormous amount of time is required for generation of file lists itself as well as their comparison because the file lists become large in size.

One prior art backup scheme will now be described with reference to FIG. 1. In the traditional scheme shown in FIG. 1, inode scan is employed to create a file list of files whose last update time is later than the time of the last backup in order to find files that have been newly created after the last copy and/or updated differential data. In this process, as intermediate files for detecting files that have been deleted since the last backup, a last full file list 1002 and a current full file list 1003 are created and saved.

After completion of the inode scan, the current full file list is compared with the full file list that was created at the last backup, deleted files are detected, and a deleted file list 1001 is created. More specifically, for creation of the deleted file list 1001, the two file lists 1002 and 1003, sorted in the order of inode number, are compared with each other as shown in FIG. 1. This comparison needs to be performed on all of the files registered in the files 1002 and 1003.

FIG. 2 illustrates a prior art process of the differential backup method of FIG. 1 and intermediate files generated in correspondence with each other. The conventional differential backup with inode scan starts at operation S1100, and a full file list of all the files whose last update time is later than the time of the last backup is created by inode scan at operation S1101, at which point a full file list 1110 is generated.

Then at operation S1102, the previous full file list associated with the last backup is retrieved, and the two intermediate files are compared at operation S1103 to create a deleted file list 1111. At operation S1104, the deleted file list 1111 and the full file list 1110 that have been created are stored in appropriate storage areas in association with the current backup.

As outlined above, the conventional differential backup with inode scan entails processing load in file comparison for generating the deleted file list 1111 in addition to the full file list 1110 which results from inode scan. Additionally, since the conventional differential backup method requires storage of extra intermediate files, the full file list 1110 and deleted file list 1111, aside from a differential file, a storage capacity for storing the intermediate files also has to be reserved. The sizes of the intermediate files themselves are now non-negligible as the volume of data to be backed up can be on the order of several terabytes and an increasing number of files are frequently accessed over networks and involve modifications.

As another example, another backup method saves metadata of all files that were backed up in the past in a database. Such a method employs a scheme in which, when a backup process is activated, the metadata of all the files saved in the database are compared with the metadata of all the files obtained by inode scan so as to detect files that have been updated or created after the last backup and/or deleted files. That is, mmbackup requires comparison of metadata of all files obtained at the last backup with metadata of all files that are obtained by inode scan in addition to inode scan.

SUMMARY

In one embodiment, provided is an information processing apparatus for backing up files stored in a storage device, comprising: a metadata management unit configured to manage metadata of files stored in the storage device; a map generation unit configured to generate a map which indicates whether the metadata associated with an identification value uniquely identifying a file in the storage device is present or absent; and a backup management unit configured to scan the metadata to detect files that have been created, modified, or deleted since a last backup, and store at least a data block and the metadata for a detected file in a backup storage device as backup information in association with the identification value.

In another embodiment, provided is a method for an information processing apparatus to back up files stored in a storage device by the information processing apparatus loading a program into memory and executing the program, comprising the operations of: generating or deleting metadata of a file stored in the storage device; generating a map which indicates whether the metadata associated with an identification value uniquely identifying a file in the storage device is present or absent; and scanning the metadata on each run of a backup process to detect files that have been created, modified, or deleted since a last backup, and storing at least a data block and the metadata for a detected file in a backup storage device as backup information in association with the identification value.

In another embodiment, provided is a machine-executable program product for implementing a method for an information processing apparatus to back up files stored in a storage device by the information processing apparatus loading a program into memory and executing the program, the program product causing the information processing apparatus to execute the operations of: generating or deleting metadata of a file stored in the storage device; generating a map which indicates whether the metadata associated with an identification value uniquely identifying a file in the storage device is present or absent; and scanning the metadata on each run of a backup process to detect files that have been created, modified, or deleted since a last backup, and storing at least a data block and the metadata for a detected file in a backup storage device as backup information in association with the identification value.

DETAILED DESCRIPTION

One embodiment of the present invention scans metadata associated with an identification value when performing a backup in order to obtain file structures that have undergone creation, modification, or deletion since the last backup. Through the scan, actual changes in file structures since the last backup are ascertained. Through the scan, the current file structures can be determined as a map that indicates whether metadata relevant to an identification value uniquely identifying a file is present or absent. Then, metadata for files that actually exist are extracted in relation to the actual changes and stored in a backup storage device as backup information in association with their identification values together with corresponding file data blocks. Furthermore, embodiments of the present invention can additionally store a map indicative of the current file structure in backup information.

The backup information is chronologically generated on each performance of backup as a data structure in which a map showing the file structure at the time of the backup in question, data blocks for files that have been created or modified, and metadata are registered in association with identification values.

When data is to be restored, a restore point specified as a desired time for restoration or the like is established. The map stored in the backup information corresponding to the restore point is then read from a backup storage device to a main storage device. Thereafter, with reference to the map, metadata and data blocks corresponding to identification values for which the map indicates presence are retrieved from historically stored backup information into the main storage device. Deleted files are directly indicated by the bit structure of the map.

The metadata and data blocks retrieved are formatted in correspondence to the map for the restore point so that the data structure specified by the map is reconstructed.

As described above, embodiments of the present invention do not involve information processing for creating typical intermediate files, such as full file lists and a deleted file list, by inode scan, and also eliminates the necessity to reserve the storage capacity for intermediate files, thus enabling efficient backup and restoration.

Figure 1:
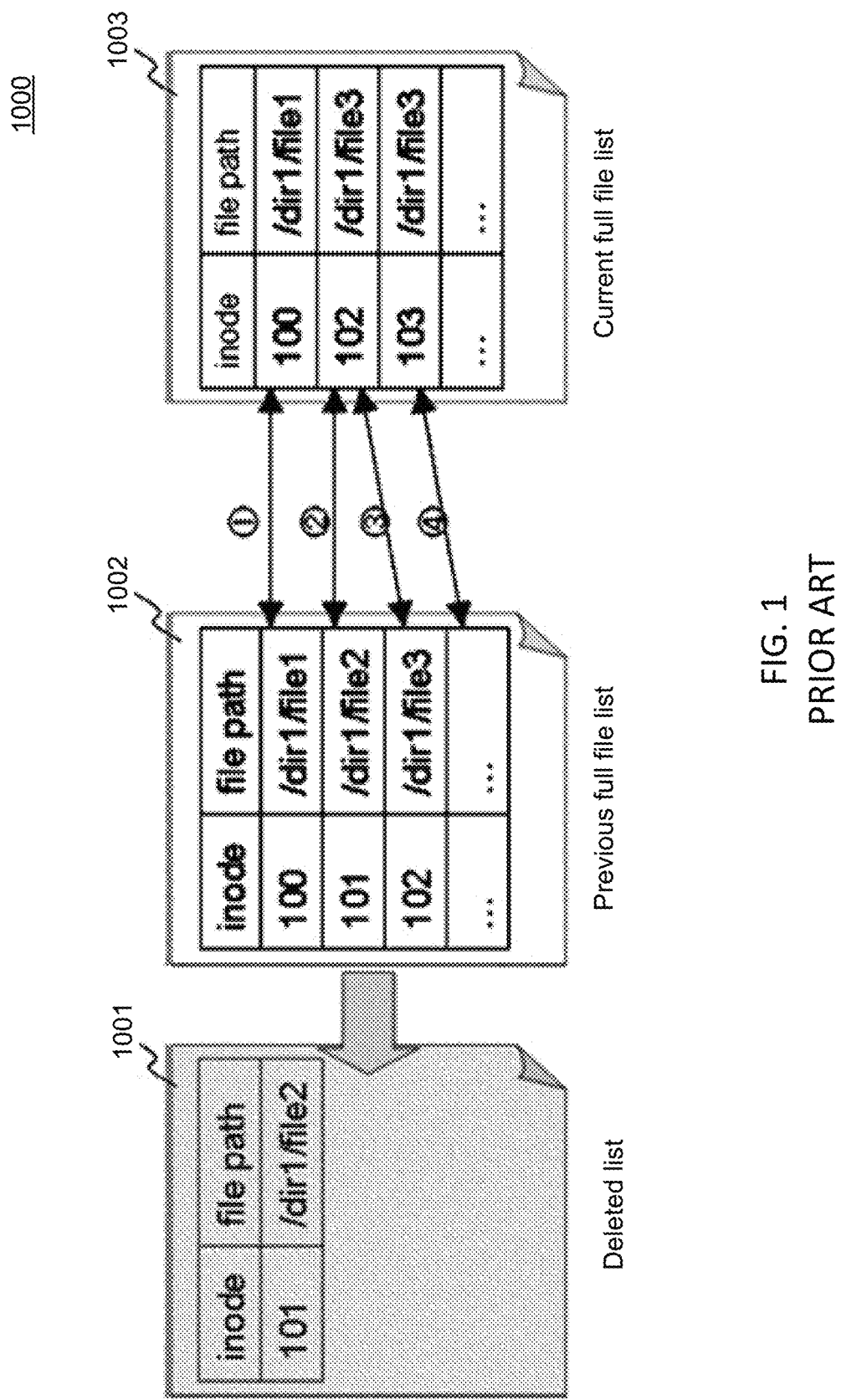
FIG. 1 illustrates a prior art backup scheme.
Figure 2:
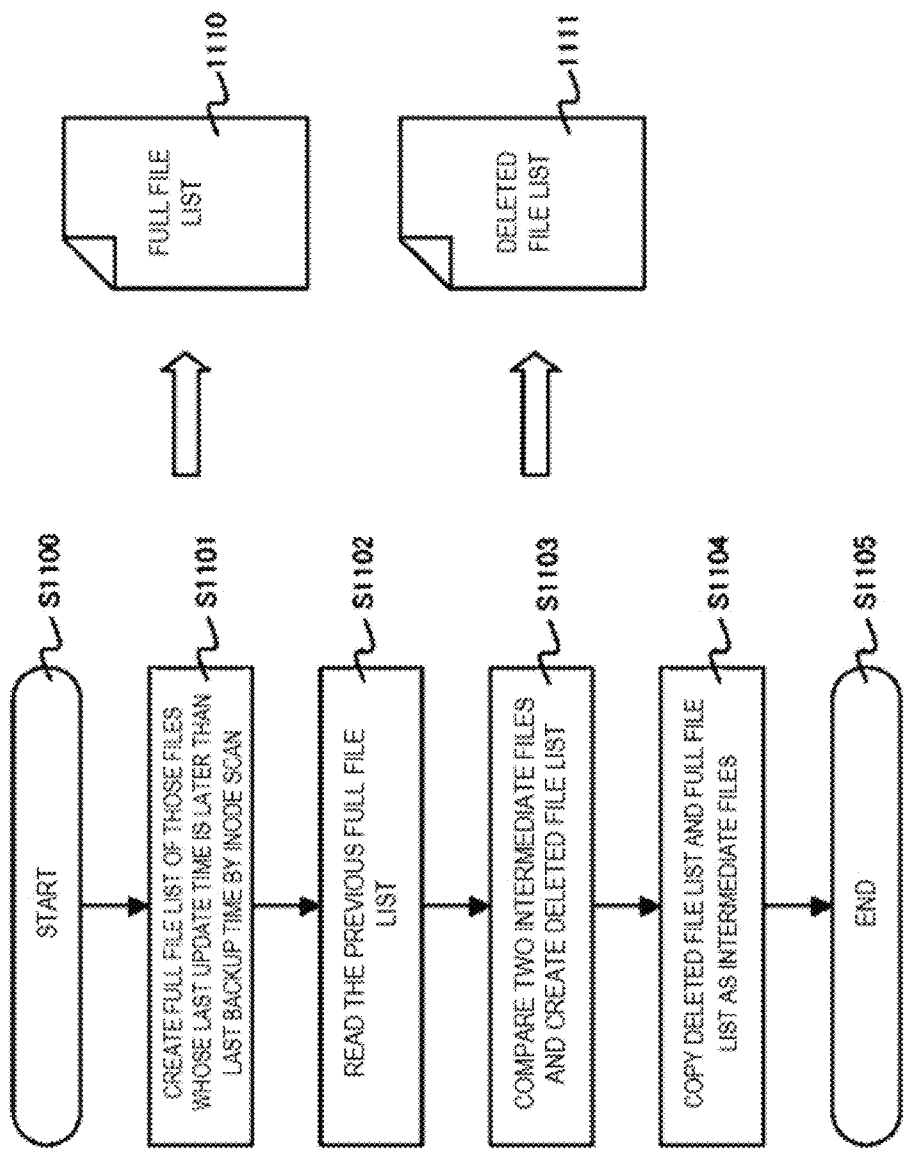
FIG. 2 illustrates a general process of the prior art backup scheme of FIG. 1 and intermediate files to be generated in correspondence with each other.
Figure 3:
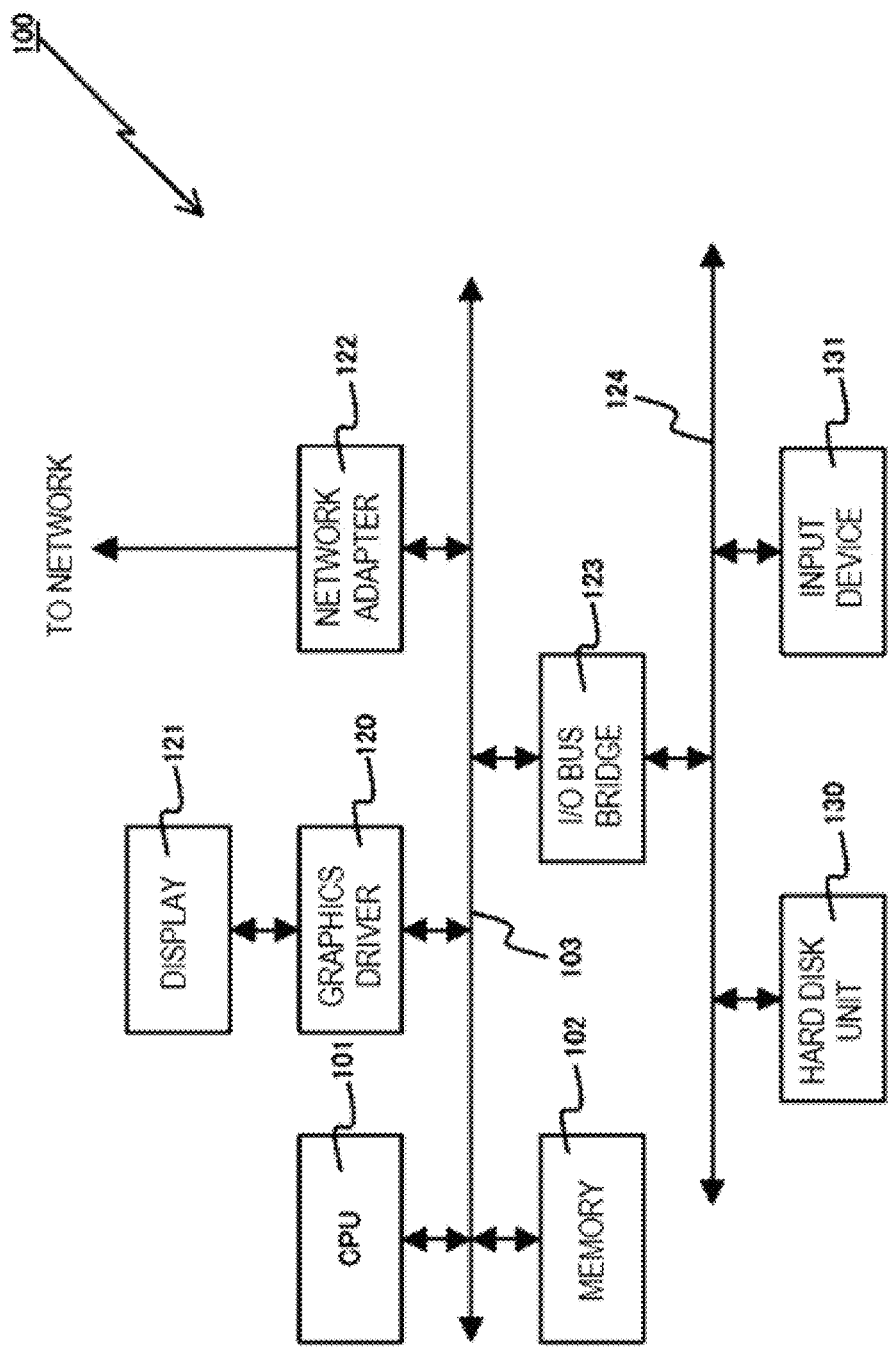
FIG. 3 is a block diagram showing a configuration of an information processing apparatus, according to an embodiment of the present invention.

FIG. 3 is a block diagram generally showing the configuration of an information processing apparatus 100, according to an embodiment of the present invention. The information processing apparatus 100 of the invention may generally be a personal computer, a workstation, a server or the like. The information processing apparatus 100 includes a processor 101, and a system memory 102 formed of a solid state memory element, such as RAM and DRAM, which enables processing by the processor 101. In this embodiment, the system memory 102 can be accessed via cache memories of a hierarchical structure, such as L1 to L3.

The processor 101 and the system memory 102 are connected with other devices or drivers in the information processing apparatus 100, for example, a graphics driver 120 and a network adapter 122, through a system bus 103. The graphics driver 120 is connected with a display device 121 through a bus and displays the results of processing performed by the processor 101 on a display screen. The network adapter 122 connects the information processing apparatus 100 to a network at transport layer and physical layer levels for establishment of a session with a client (not shown).

To the system bus 103, an I/O bus bridge 123 is also connected. On the downstream side of the I/O bus bridge 123, a storage device 130 such as a hard disk or DAT is connected according to IDE, ATA, ATAPI, serial ATA, SCSI, USB and the like via an I/O bus 124, such as a PCI or PCI-Express bus. To the I/O bus 124, an input device 131, which may be a keyboard or a pointing device such as a mouse, is also connected via a bus such as a USB bus for receiving inputs and commands from an operator, such as a system administrator.

Specific examples of the processor used in the information processing apparatus 100 include so-called x86 single core or multi-core processors, such as PENTIUM® series, Core2Duo®, Core2Quad®, Core® i3, i5, or i7, as well as Xeon®, PENTIUM®-compatible processors, POWER PC®, MIPS, and Z/Architecture processors.

The operating systems (OS) to be used may be MacOS™, Windows®, Windows® 200X Server, UNIX®, AIX®, LINUX®, or other appropriate OSs. The information processing apparatus 100 further stores and executes application programs that run on the OS written in an object oriented programming language, such as C++, Visual C++, VisualBasic, Java®, Perl, Ruby, and Python.

Figure 4:
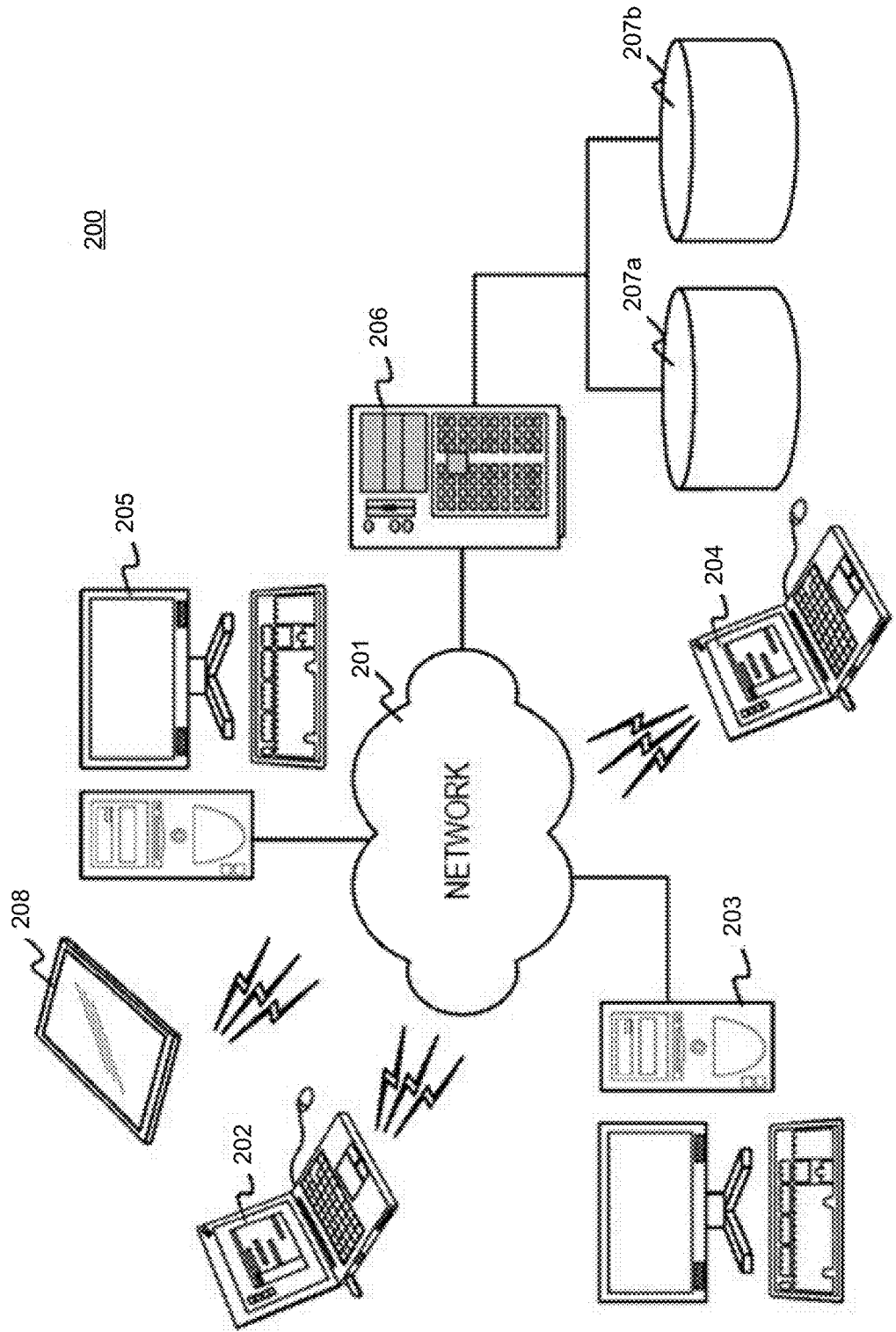
FIG. 4 shows an embodiment of an information processing system implementing information processing apparatuses, according to an embodiment of the present invention.

FIG. 4 shows an embodiment of an information processing system 200 implementing information processing apparatuses, according to an embodiment of the present invention. Backup methods according to embodiments of the present invention can be implemented on with information processing system 200. In the information processing system 200, multiple information processing apparatuses 202, 203, 204, 205, 206, 208 are interconnected over a network 201 such that they can communicate data and the like with one another. The information processing apparatuses 202 and 204 are notebook personal computers, while the information processing apparatuses 203 and 205 are desktop computers, workstations, or local servers. A portable terminal 208, such as a tablet computer or a smartphone, is also connected with the network 201 and performs various kinds of information transmission. The network 201 may be a local area network (LAN), the Internet, or a heterogeneous network including these networks.

To the network 201, a server device 206 is connected and accumulates information from various information processing apparatuses that connect to it over the network 201 and also provides information stored in a database or the like to information processing apparatuses. The server device 206 in this embodiment may be implemented as a server that provides client-server services, a web server, an FTP server, or a storage server; in an embodiment, it may be implemented as a cloud server that provides data services and application services.

A backup device will be described below as being implemented in the server device 206 as an illustrative embodiment. When the server device 206 functions as the backup device, the server device 206 stores various kinds of information and data managed by the server device 206 in persistent storage media 207a and 207b, such as hard disk units or magnetic tape drives, and also backs up them. The server device 206 may also be equipped with a RAID system or the like for the purpose of redundant recording. The information processing apparatus in this embodiment may be a backup means independent from the RAID system or implemented as a protocol for the RAID system.

Figure 5:
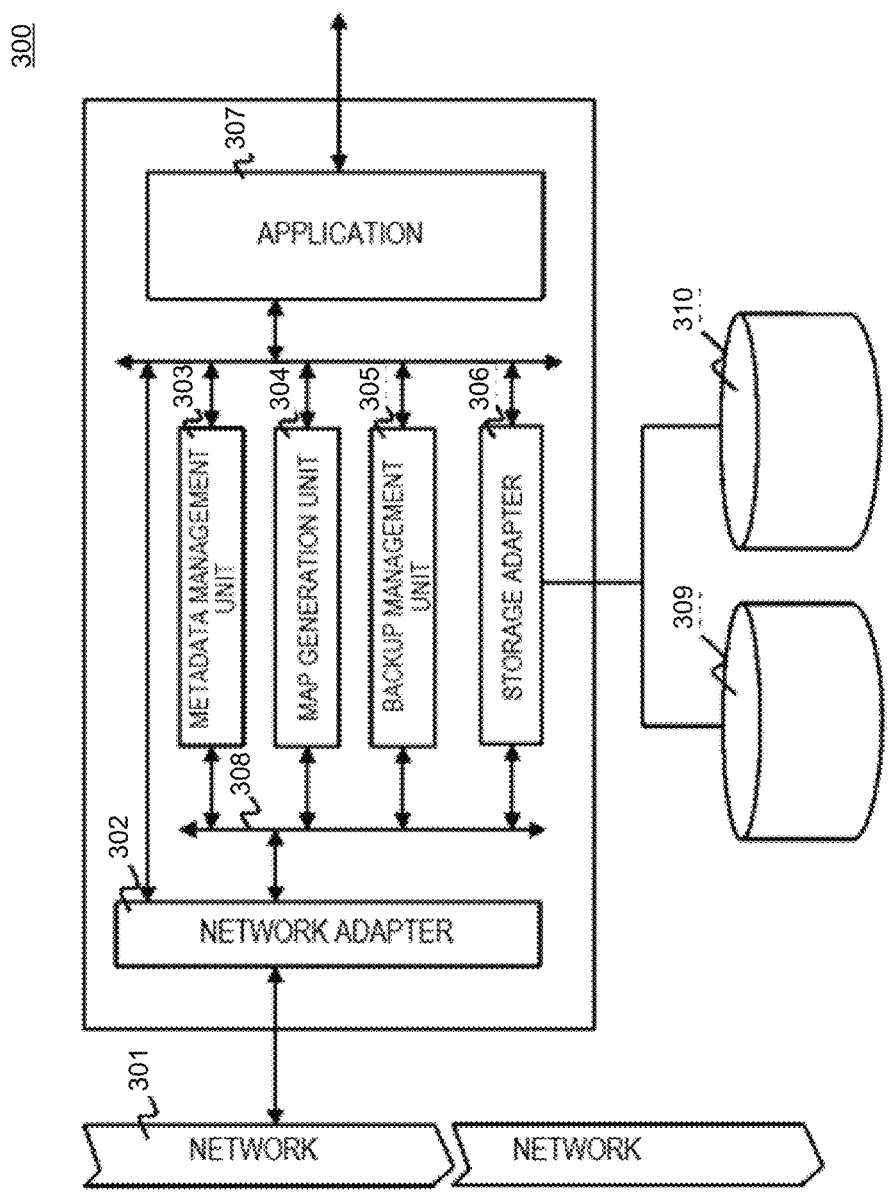
FIG. 5 is a functional block diagram of a backup device in a server device, according to an embodiment of the present invention.

FIG. 5 is a functional block diagram of a backup device 300, according to an embodiment of the present invention. The functional blocks in FIG. 5 are implemented in an information processing apparatus by the server device 206 loading a program into processor-readable memory and a processor executing the program in the memory. The program in this embodiment may be implemented as a module that is directly managed by an operating system (OS). As illustrated in FIG. 5, the backup device 300 includes a metadata management unit 303 and a map generation unit 304.

The metadata management unit 303 is a functional unit that generates metadata for a particular file, such as file size, last update time, UID, and data block address, and stores them in a main storage device 309. Metadata is generated as information having a unique identification value assigned for each file. When a file is deleted, the contents of the corresponding metadata are deleted while the identification value is preserved. Accordingly, once a file is created, the storage area for metadata allocated to the corresponding identification value is preserved as void even if the file is deleted. Although not limited to a specific format, the aforementioned metadata can be of a data format referred to as inode. Alternatively, they may be in a data format referred to as NTFS in Windows® OSs. Metadata used in MacOS® may also be used.

The map generation unit 304 determines whether there is corresponding metadata or not for an identification value relating to metadata of a file created by the server device 206, and creates a map of the file structure currently present in the main storage device 309. The map has a function of enabling determination of whether metadata corresponding to a certain identification value is present or absent, and can be created as a map in which binary 1 is assigned when metadata is present and binary 0 when metadata is not present. The map may be referenced as a bitmap in this embodiment.

The map may also be registered in the main storage device 309 as persistent data in synchronization with creation, modification, and deletion of files by applications. The map can be generated on-the-fly during a backup process and additionally stored in backup information in a backup storage device 310 as information exclusively used for restoration.

The backup device 300 further includes a backup management unit 305. The backup management unit 305 scans metadata to identify files that have been created, modified, or deleted by an application 307 after the last backup process by reference to, for example, time stamps. The backup management unit 305 stores the metadata and the data block for a detected file in the backup storage device 310 so as to be associated with the identification value that uniquely identifies the file in hardware.

In embodiments of the present invention, when a map is already created, the backup storage device 310 performs processing for replicating it into the backup storage device 310. In another embodiment, the backup management unit 305 may invoke the map generation unit 304 during a backup process, instruct it to create a map on-the-fly, and store the map in the backup storage device 310.

The functions of the backup device 300 in this embodiment will be further described. The backup device 300 carries out backup in an established sequence and generates historical backup information. The backup information can be stored in its entirety in the same storage area as one piece of backup information. Other embodiments may adopt a format in which data blocks are stored in a separate storage area from metadata and the map but they are associated with each other. Although the backup storage device 310 is described as a single device for the purpose of illustration, multiple backup storage devices 310 may be used to perform redundant backup in accordance with a RAID scheme.

The backup device 300 includes a network adapter 302 and a storage adapter 306 as external storage control units. The network adapter 302 receives requests from remote computers that externally access over a network 301 and has the server device 206 perform various kinds of processing. In a variation of this embodiment, the server device 206 also provides the function of enabling data stored in the main storage device 309 to be sent to a data center at a remote location for backup or recovery.

The storage adapter 306 stores or deletes the corresponding file in the main storage device 309 together with the data block and metadata in response to creation, deletion, or modification of a file by an application 307. The storage adapter 306 also provides the function of replicating a file stored in the main storage device 309 into the backup storage device 310 with other information when the backup process in this embodiment is locally performed. The storage adapter 306 may also have RAID functions.

Figure 6:
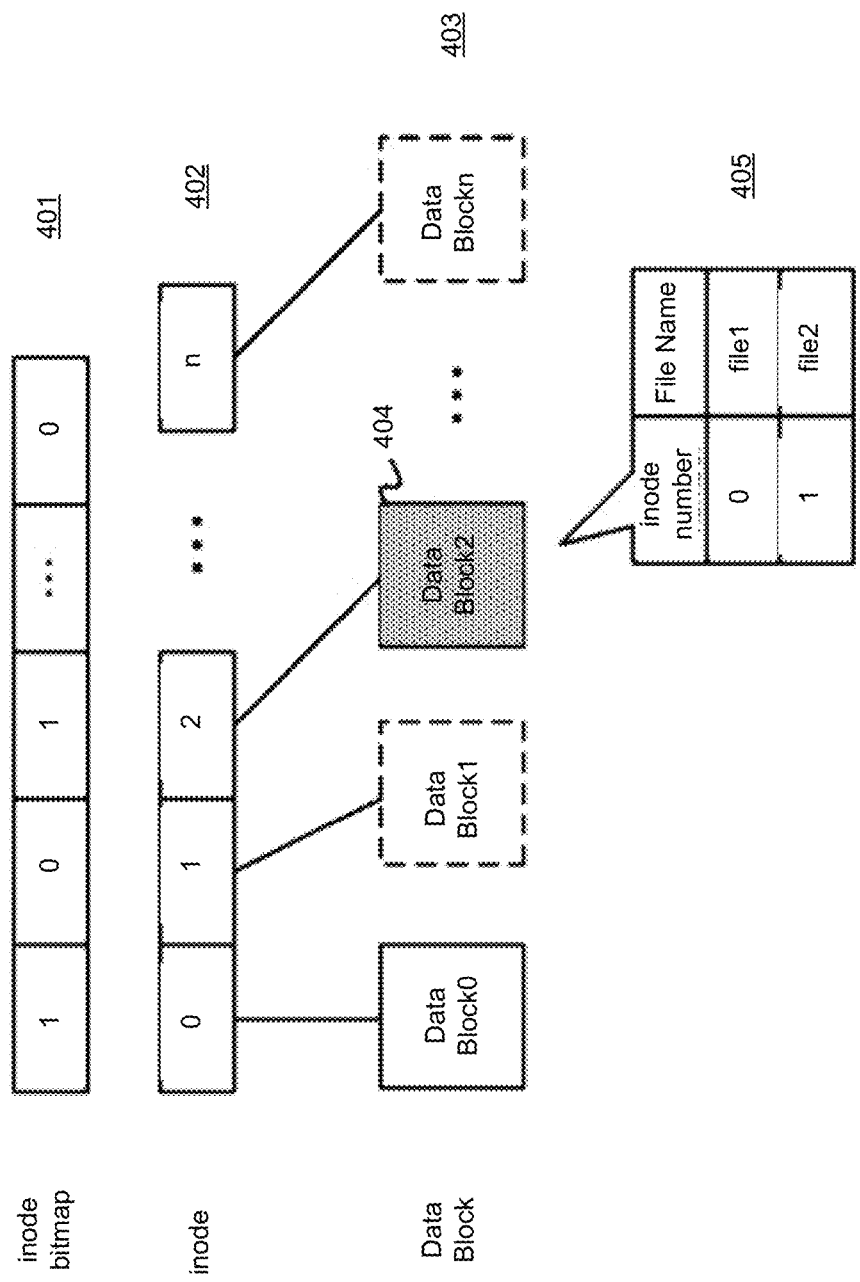
FIG. 6 illustrates a data structure for a file to be backed up, according to an embodiment of the present invention.

For the purpose of illustration, the following description assumes that metadata is the inode used in UNIX®/LINUX® OSs as a specific example. FIG. 6 illustrates a data structure 400 for a file to be backed up in an embodiment of the present invention. The embodiment shown in FIG. 6 describes an embodiment in which data blocks 403, inode numbers, and an inode bitmap are backed up in the same backup storage device 310. The file is created as a data block 403, which is the substantial contents of data, and these data blocks 403 are recorded in a physical medium in a format appropriate for a storage medium such as a hard disk or magnetic tape.

Information on the directory structure is also recorded as an independent data block; in the embodiment shown in FIG. 6, a data block 404 is described as representing the directory structure. The directory structure is of a format 405 which maps a file name contained in the directory to the inode number of the file. Of the data blocks shown in FIG. 6, data blocks indicated by broken lines represent data blocks that were generated in the past and have been deleted.

Each data block is associated with an inode number 402 as a unique identification value, and metadata of the relevant data block are stored in the storage area specified by the inode number. Inode data for a deleted data block is represented as void (empty) because the data block does not exist at present and metadata does not exist either.

An inode bitmap 401 is a representation of the presence or absence of metadata specified by an inode number in a binary value form. When metadata exists, that is, a data block containing significant data is currently present, the inode bitmap 401 sets a bit (assigns binary 1) for the corresponding inode number, and when a data block corresponding to the inode number of interest does not exist, the inode bitmap 401 sets a bit (assigns binary 0). The inode bitmap 401 is generated for all of the existing inode numbers. FIG. 6 shows that bits for inode numbers that correspond to deleted data blocks are set to 0.

Figure 7:
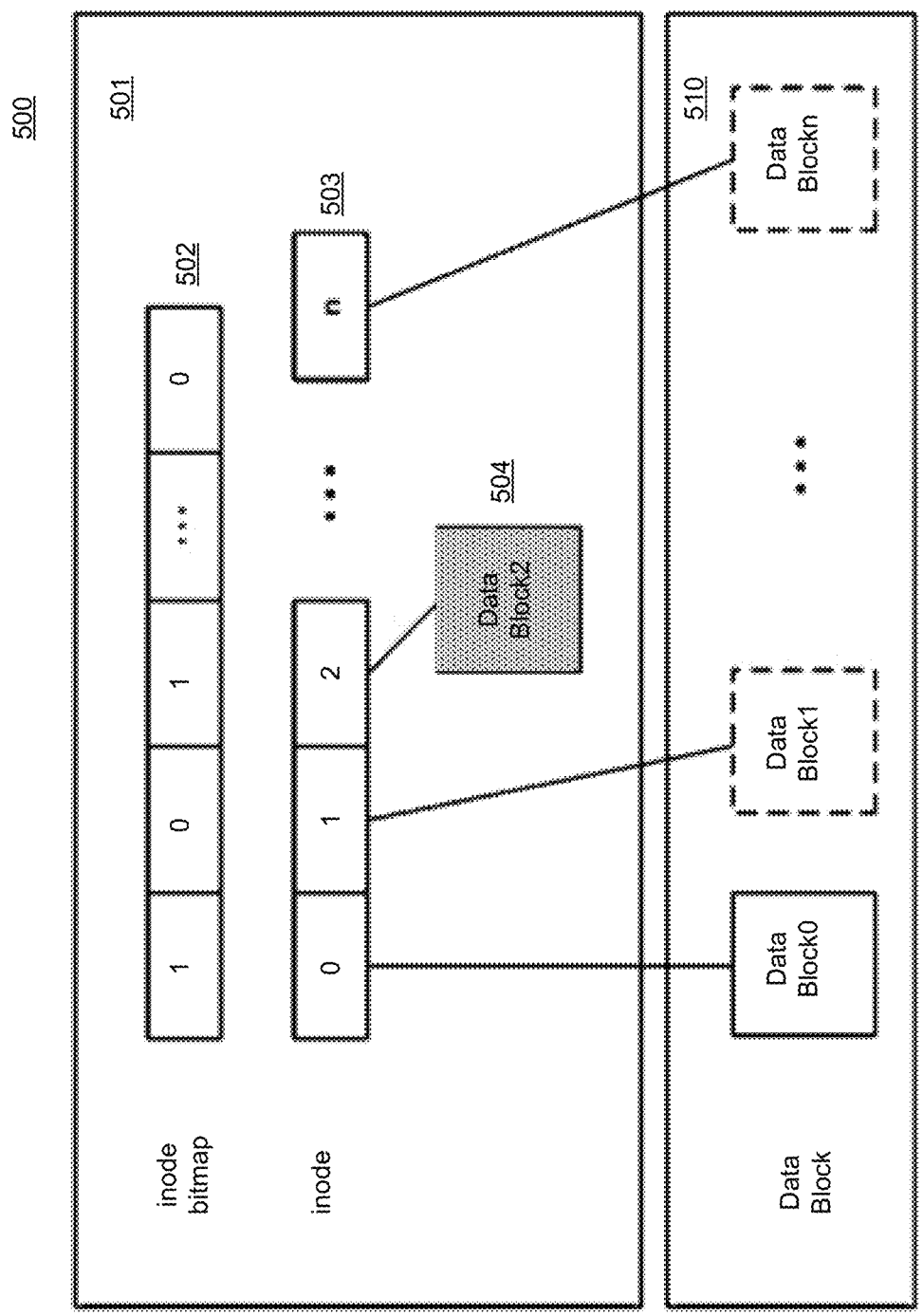
FIG. 7 illustrates a data structure in an embodiment of the present invention in which metadata and a directory structure are backed up separately from data blocks.

FIG. 7 illustrates a data structure 500 in an embodiment of the present invention in which metadata and the directory structure are backed up separately from data blocks. In the embodiment shown in FIG. 7, an inode bitmap 502 and inode 503 are backed up according to the backup scheme of this embodiment. Data blocks 510, meanwhile, follows a so-called scalable backup scheme, which uses TSM (Tivoli Storage Manager®) process for example, which is separate from backup, and performs backup independently by a hierarchical backup process across storages. In this backup scheme, the data blocks 510 are stored separately from metadata and the like.

Figure 8:
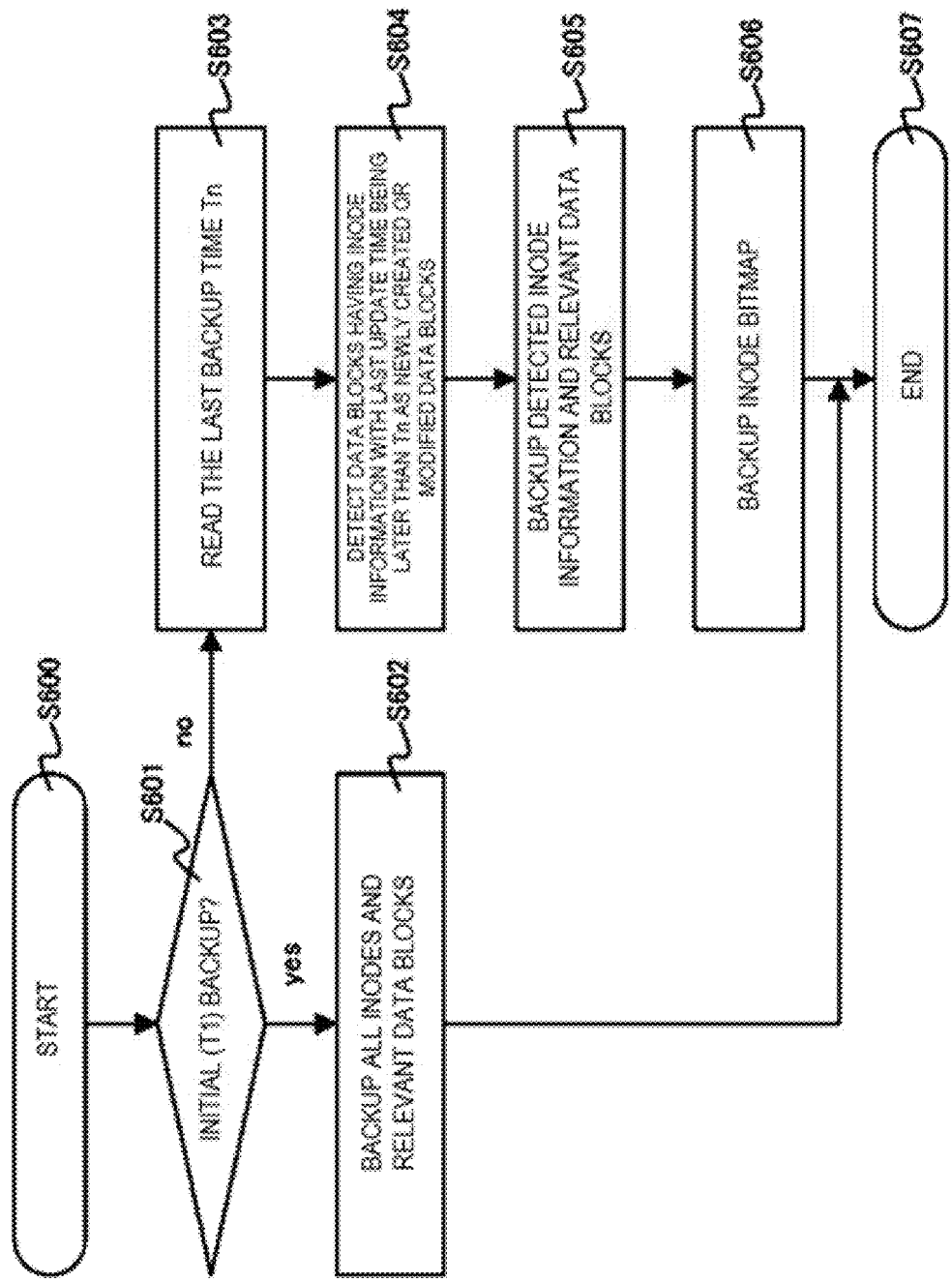
FIG. 8 is a flowchart illustrating a backup method, according to an embodiment of the present invention.

FIG. 8 is a flowchart illustrating a backup method according to an embodiment of the present invention. The backup method in this embodiment starts at operation S600, and whether the current backup is the initial backup is determined at operation S601. If the current backup is the initial backup (yes), all inodes and the relevant data blocks are backed up at operation S602, and the process ends at operation S607.

If it is determined at operation S601 that the current backup is not the initial backup (no), the last backup time Tn is read at operation S603, and those data blocks that have inode information in which the last update time is later than Tn are detected as data blocks that have been newly created or modified at operation S604. At operation S605, the inode information of the data blocks detected and the data blocks themselves are replicated in the backup storage device 310 in association with their inode numbers. At operation S606, an inode bitmap is generated if one has not been generated and the inode bitmap is backed up by replicating it in the backup storage device 310, and then the process ends at operation S607.

Figure 9:
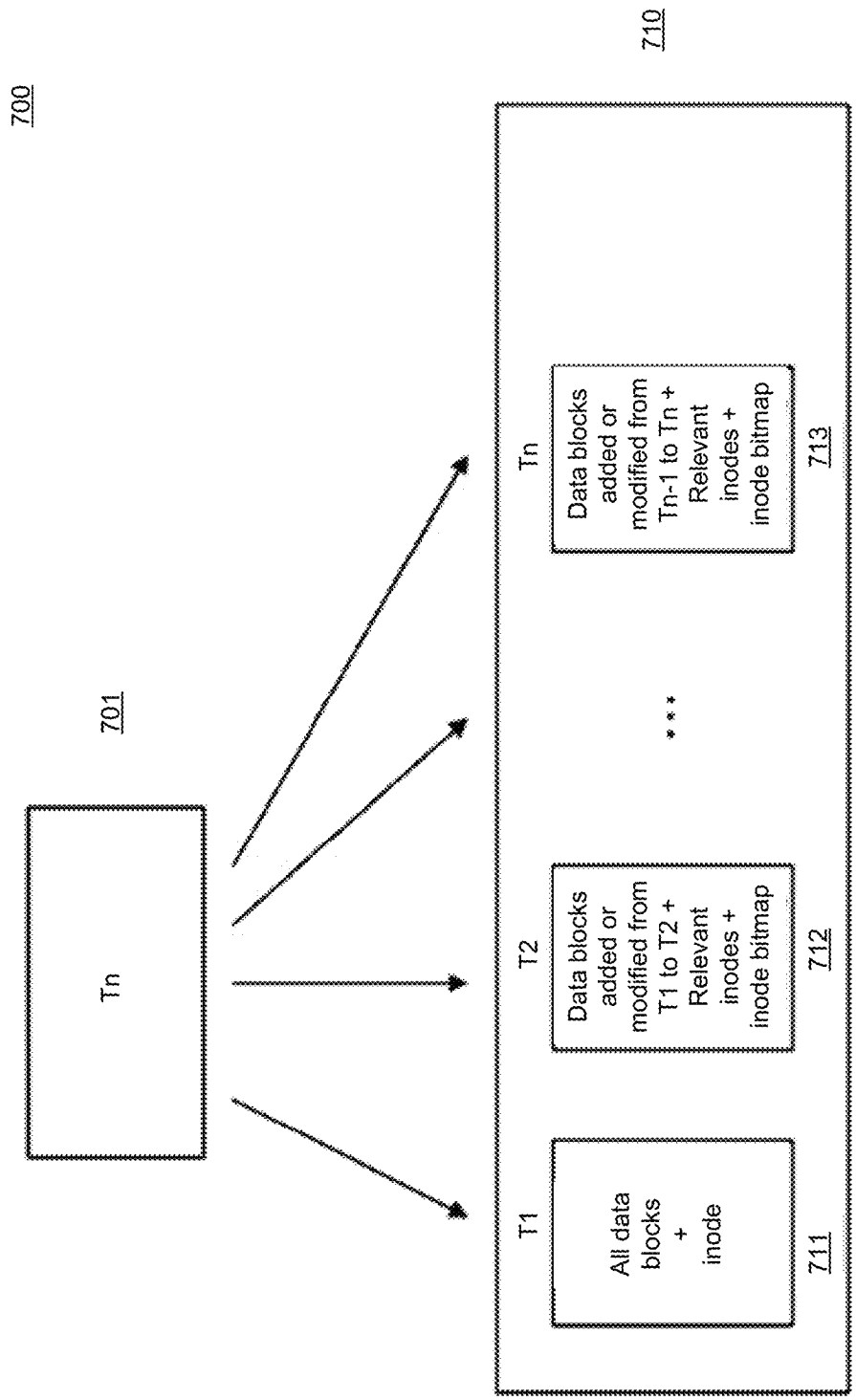
FIG. 9 shows backup information generated in the process of FIG. 8, according to an embodiment of the present invention.

Every time the backup time is different from the previous backup time at the time of completion of operation S607, backup information including the differential data block, inodes, and the inode bitmap (except for the initial backup) is generated. FIG. 9 shows an embodiment of backup information 700 generated in the process of FIG. 8.

Suppose that a file 701 with backup time Tn is currently present in the main storage device 309. In the backup storage device 310, meanwhile, the initial (T1) backup information 711, the second (T2) backup information 712, and backup information 713 for time Tn are generated as backup history 710. Since T2 to Tn are not the initial backup, differential data blocks that have been added or modified from T1 to Tn, inodes relevant to those differential data blocks, and the inode bitmap are generated as backup information 712, 713.

The backup information 711, 712, 713 constituting the backup history 710 can be stored in an appropriate storage area of the backup storage device 310. When the backup storage device 310 is a hard disk drive, for example, they may be stored as directories or the like. When the backup storage device 310 is a magnetic tape drive, they may be stored in different locations on magnetic tape.

Figure 10:
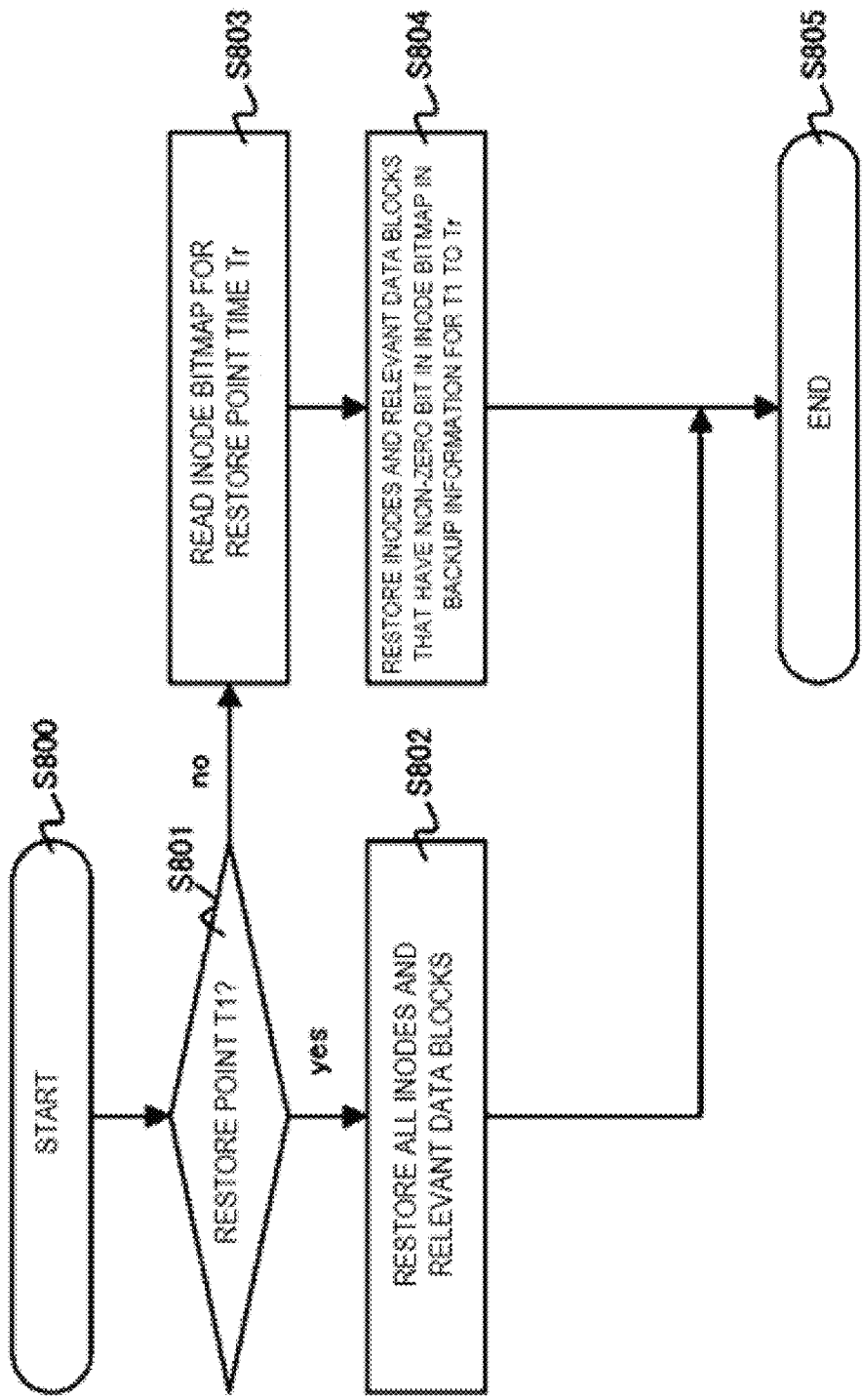
FIG. 10 is a flowchart illustrating a process for restoring backup information, according to an embodiment of the present invention.

FIG. 10 is a flowchart illustrating a process for restoring backup information, according to an embodiment of the present invention. The process for restoring information that has been backed up by the backup method of this embodiment starts at operation S800, and whether the restore point is T1 or not is determined at operation S801. The restore point may be specified by the user or set by the system. If the restore point is determined to be T1 at operation S801 (yes), all inodes and the relevant data blocks are restored from the backup storage device 310 to the main storage device 309 at operation S802, and the process ends at operation S805.

If the restore point is determined not to be T1 at operation S801, an inode bitmap in which the identification value of the restore point, a timestamp for example, is included in the backup information for Tr is read into the main storage device 309 at operation S803. Then, at operation S804, the backup information T1 through Tr are retrieved, bit information in the inode bitmap read at operation S803 is referenced, metadata for an inode number for which a bit is set and the corresponding data block are read from the backup storage device 310 to the main storage device 309, and the metadata and data block are restored by storing them in the storage area for the corresponding inode number. After the file structure defined by the inode bitmap for the restore point Tr has been obtained, the restoration is finished at operation S805.

Figure 11:
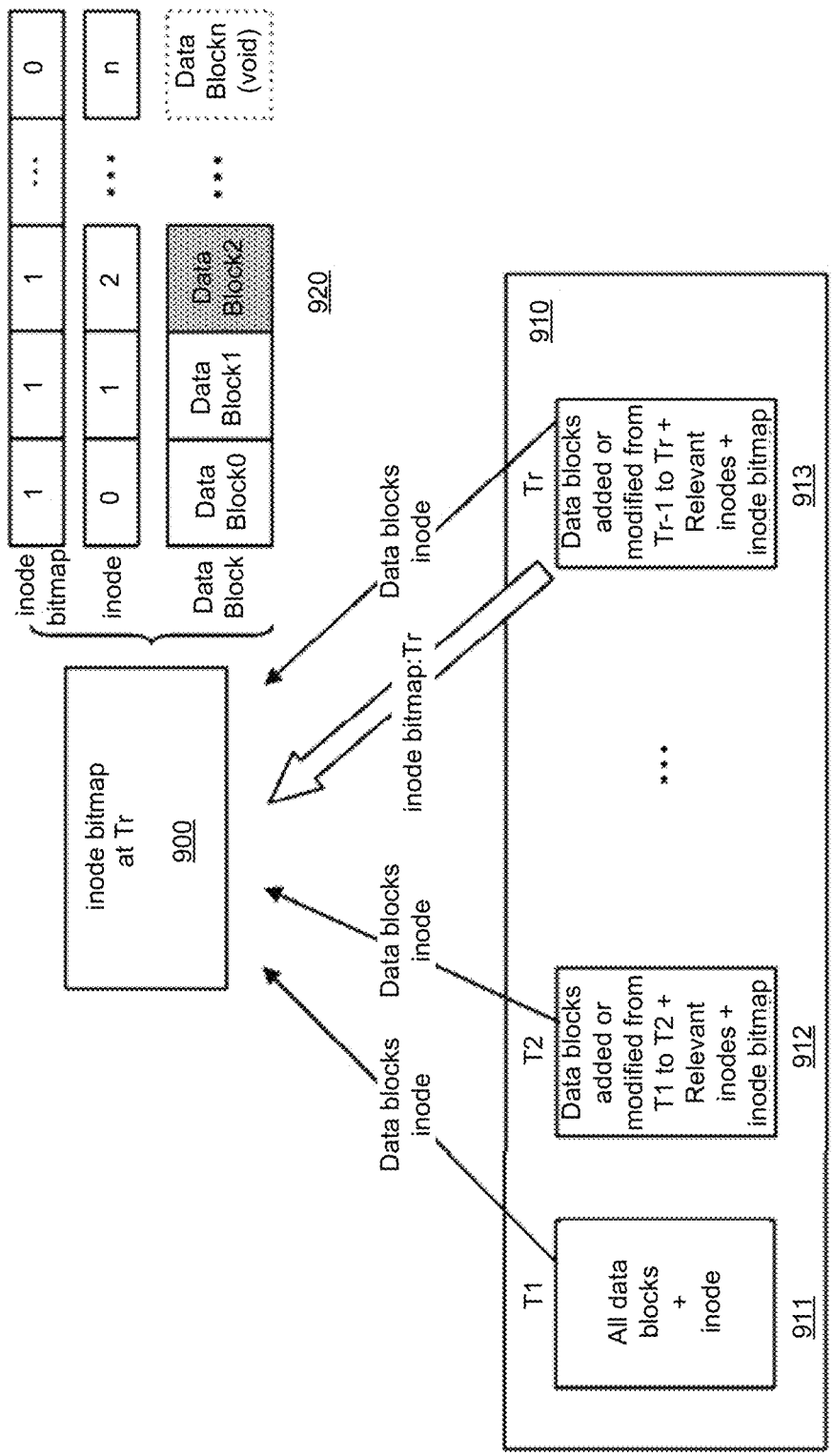
FIG. 11 schematically shows data and information replicated from a backup storage device to a main storage device in restoration process, according to an embodiment of the present invention.

FIG. 11 schematically shows the data and information replicated from the backup storage device 310 to the main storage device 309 in the restoration process, according to an embodiment of the present invention. At the start of restoration, backup information 913 for restore point Tr is retrieved from backup history 910, and the registered inode bitmap 900 is read into the main storage device 309. Next, backup information 911 to 913 are searched from newer backup information to older backup information in accordance with the bit image of the inode bitmap 900, and the corresponding latest data blocks and metadata are taken from backup information in which inode numbers having a bit being set in the inode bitmap are present. After this, the metadata and data blocks are stored in the storage area specified by the corresponding inode number to restore the inode information and the data blocks.

If metadata and a data block identified by the same inode number are found in different pieces of backup information, the metadata and data block in the backup information having a more recent backup time are read and restored. Here, by excluding inode numbers for which restoration has been already performed from the search, efficiency of search can be improved as restoration proceeds. The sequence of inode numbers for restoration may start with backup information that corresponds to the least significant bit of the inode bitmap or backup information that corresponds to the most significant bit of the inode bitmap.

In the case of a scalable backup scheme in which the inode number, inode information, and the directory data block are stored separately from file data blocks, restoration can be performed by adaptively expanding the backup storage device or storage area to be searched.

When the foregoing restoration process is completed, the inodes and data blocks corresponding to the inode bitmap specified by the restore point Tr are reconstructed as restored data 920. As described above, the backup and restoration processes in this embodiment enable restoration including deleted files without using intermediate files generated for the purpose of identifying deleted files. Thus, the backup information 911 to 913 shown in FIG. 11 do not include files unnecessary for restoration, so that the size of files generated in chronological backups of large data files can be minimized. After restoration, the inode bitmap in the main storage device 309 may be either deleted or preserved.

Additionally, since the backup method of this embodiment does not require the process of generating intermediate files for identifying deleted files, the backup process itself can be speeded up as it involves only a minimum process for replicating information that is essentially necessary for backup, namely differential data, an inode bitmap, and inode information. This consequently enables a shorter time interval between restore points, so restoration of increased accuracy becomes possible.

While the backup history 910 may be generated locally in a local storage, it may be generated at a data center at a remote location by means of an appropriate data transfer protocol, such as HTTP or FTP, using a remote storage at the data center. Such an embodiment can eliminate file transfer of intermediate files, allowing provision of more efficient storage services and/or cloud services. When backup and restoration are performed across different pieces of hardware, an IP address or MAC address, for example, that uniquely identifies the hardware to which data is backed up may be concatenated to the inode number and an identification value for specifying inode information may be generated for each piece of hardware so as to enable file access.

For restoration at a particular node using a remote storage in a storage area network (SAN), for example, backup information 911, 912 for another node may be used to perform data restoration on a particular information processing apparatus. Such an embodiment achieves a more efficient restoration process while ensuring data redundancy, enabling improvement of data integrity.

As described above, the present invention provides an information processing apparatus, information processing system, backup method, and program that enable efficient differential backup.

While the present invention has been described by illustrating its embodiments, the present invention is not limited to the embodiments shown in the drawings but permits modifications to the extent perceivable to those skilled in the art, such as other embodiments, addition, modification, or deletion. Such variations are all encompassed in the scope of the present invention so long as they provide the operations and effects of the invention.

What is claimed is:

1. A method for an information processing apparatus to back up files stored in a storage device by the information processing apparatus loading a program into memory and executing the program, comprising the operations of:
   generating or deleting metadata of a file stored in the storage device;
   generating a map which indicates whether the metadata associated with an identification value uniquely identifying a file in the storage device is present or absent;
   scanning the metadata on each run of a backup process to detect files that have been created, modified, or deleted since a last backup, and storing the map for current files, at least a data block, and the metadata for a detected file in a backup storage device as backup information in association with the identification value;
   wherein generating or deleting metadata of a file comprises, for respective files, generating a respective file size, a respective last update time, a respective identification value, and a respective data block address;
   wherein the map for current files comprises an inode bitmap, wherein the data block comprises differential data for the detected file, and wherein the metadata for the detected file comprises inode information for the detected file; wherein the method further comprises:
   restoring data by restoring at least the inode information for the detected file and the differential data for the detected file based on the inode bitmap having a bit set to 1 for the detected file.

2. The method according to claim 1, wherein the map is a bitmap in which the presence or absence of the metadata is represented by a binary value.

3. The method according to claim 1, wherein the operation of storing in the backup storage device comprises storing in a remote storage over a network.

4. The method according to claim 1, wherein the operation of storing in the backup storage device comprises storing in a local storage via a storage adapter.

* * * * *